United States Patent
Rohmer et al.

(10) Patent No.: US 10,239,207 B2
(45) Date of Patent: Mar. 26, 2019

(54) CONTROL OF A ROBOT

(71) Applicant: KUKA Deutschland GmbH, Augsburg (DE)

(72) Inventors: Matthias Rohmer, Augsburg (DE); Martin Mueller-Sommer, Aindling (DE); Marc-Walter Ueberle, Friedberg (DE); Gunter Schreiber, Friedberg (DE); Uwe Bonin, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 124 days.

(21) Appl. No.: 15/351,778

(22) Filed: Nov. 15, 2016

(65) Prior Publication Data

US 2017/0144302 A1 May 25, 2017

(30) Foreign Application Priority Data

Nov. 19, 2015 (DE) .......................... 10 2015 014 994

(51) Int. Cl.
*B25J 9/16* (2006.01)

(52) U.S. Cl.
CPC ............ *B25J 9/1651* (2013.01); *B25J 9/1633* (2013.01); *B25J 9/1664* (2013.01); *G05B 2219/39339* (2013.01); *G05B 2219/43203* (2013.01)

(58) Field of Classification Search
CPC ...... B25J 9/1633; B25J 9/1651; B25J 9/1666; B25J 9/1676; G05B 2219/43203; G05B 2219/40474; G05B 2219/40467
See application file for complete search history.

(56) References Cited

U.S. PATENT DOCUMENTS

| | | | |
|---|---|---|---|
| 2004/0128026 A1* | 7/2004 | Harris | B25J 9/1689 |
| | | | 700/245 |
| 2013/0090761 A1 | 4/2013 | Sejimo et al. | |
| 2013/0172902 A1 | 7/2013 | Lightcap et al. | |
| 2013/0253702 A1* | 9/2013 | Lecours | B25J 9/163 |
| | | | 700/250 |

(Continued)

FOREIGN PATENT DOCUMENTS

| | | |
|---|---|---|
| CN | 103107767 A | 5/2013 |
| CN | 103496633 A | 1/2014 |
| CN | 104254430 A | 12/2014 |

(Continued)

OTHER PUBLICATIONS

European Patent Office; Search Report in European Patent Application No. 16002371.9 dated Apr. 3, 2017; 8 pages.

(Continued)

*Primary Examiner* — Spencer D Patton
(74) *Attorney, Agent, or Firm* — Dortin & Willis, LLP

(57) ABSTRACT

A method for controlling a robot having a drive arrangement with at least one drive includes determining an actual velocity of the robot, determining a target velocity for the robot, and determining a damping drive parameter based on a difference between the target velocity and the actual velocity. The target velocity is determined based on at least one of a predetermined maximum velocity, a predetermined minimum velocity, or a first distance of the robot from at least one predetermined boundary. The drive arrangement of the robot is then controlled based on the damping drive parameter.

14 Claims, 2 Drawing Sheets

(56) References Cited

U.S. PATENT DOCUMENTS

2015/0025684 A1    1/2015    Negishi

FOREIGN PATENT DOCUMENTS

| | | |
|---|---|---|
| JP | H0780786 A | 3/1995 |
| WO | 02060653 A2 | 8/2002 |

OTHER PUBLICATIONS

Peter Englert; publication entitled "Simulation des Frasens mit Industrierobotern: Trajektorienplanung und experimentelle Parameteridentifikation" dated May 1, 2011; 30 pages.
Nirut Naksuk; publication entitled "The Implementation of a Natural Admittance Controller on an Industrial Robot" dated Jan. 1, 2000; 82 pages.
Korean Patent Office; Office Action in related Korean Patent Application No. 10-2016-0153323 dated Mar. 22, 2018; 12 pages.
Chinese Patent Office; Examination Report in related Chinese Patent Application No. 201611043636X dated Sep. 29, 2018; 5 pages.
Chinese Patent Office; Search Report in related Chinese Patent Application No. 201611043636X dated Sep. 19, 2018; 2 pages.

* cited by examiner

CONTROL OF A ROBOT

CROSS-REFERENCE TO RELATED APPLICATIONS

This application claims the benefit of priority under 35 U.S.C. § 119(a) to German Patent Application DE 10 2015 014 994.6, filed Nov. 19, 2015 (pending), the disclosure of which is incorporated by reference herein in its entirety.

TECHNICAL FIELD

The present invention relates to a method and a system for controlling a robot, as well as a computer programming product for executing the method.

BACKGROUND

A robot control is known from US 2004/0128026 A1 comprising an admittance control, with its control parameters being increased when the robot approaches a predetermined boundary.

The objective of the present invention is to improve the control of a robot.

SUMMARY

According to one embodiment of the present invention a method for controlling a robot includes the following particularly automated and/or computer-based steps:
  determining an actual velocity of the robot;
  determining a target velocity;
  determining a damping drive parameter based and/or depending on a difference between the target velocity and the actual velocity; and
  controlling a drive arrangement comprising one or more drives of the robot based on and/or depending on the damping drive parameter, wherein the target velocity being determined based and/or depending on
  a predetermined maximum velocity,
  a predetermined minimum velocity, and/or
  a distance and/or a distance of the robot from one or more predetermined boundaries.

A velocity, particularly the actual and/or the target velocity, may include in one embodiment a one-dimensional or multi-dimensional translational and/or rotational velocity of a reference fixed to a robot, particularly the TCP of the robot, may particularly represent it, particularly a velocity (component) in one or more spatial directions and/or degrees of freedom. Similarly, a one-dimensional or multi-dimensional velocity, particularly the actual and/or target velocity, may comprise in one embodiment a translational and/or rotational velocity of one or more drives and/or joints and/or degrees of freedom of joints of a robot, particularly represent it. It is here generally designated $\dot{q}$.

An actual velocity can be detected in one embodiment with respective sensors, using in one further development a velocity of a robot-fixed reference potentially being determined based on a measured velocity of joints of the robot using a forward transformation.

In one embodiment the robot comprises one or more, particularly at least six or more axes and/or joints, particularly axes of rotation and/or linear and/or thrust axes and/or joints, and in one further development it comprises drives, particularly electric motors for moving the axes and/or joints. It represents in one embodiment an industrial robot.

A one-dimensional or multi-dimensional drive parameter may in one embodiment comprise one or more driving forces and/or torques/moment of the robot, particularly represent them. They are here generally designated $\tau$.

In one embodiment the drive arrangement is controlled based on a drive parameter, particularly a damping drive parameter and in a further development one or more additional drive parameters, particularly the resilience-drive parameter explained in the following such that it (also) applies and/or attempts to apply these drive parameter(s), particularly (also) applies and/or implements them at least essentially. Accordingly, such a drive parameter may comprise one or more target or actual driving forces and/or torque/moments of the robot and/or portions thereof, particularly represent them.

In one embodiment, by the damping driving parameter a motion of the robot, particularly a motion of the robot commanded by a resilience control and/or manual control, can be damped in an advantageous fashion. In other words, in one embodiment a damping is provided which in a further development advantageously acts additionally and/or parallel to a damping within the scope of a resilience control.

By determining the target velocity based on particularly fixed and or variably, predetermined one-dimensional or multi-dimensional maximum velocities, in one embodiment advantageously a velocity of the robot can be limited, particularly in a motion commanded by a resilience control and/or manual guidance of the robot: if the actual velocity exceeds the predetermined maximum velocity, in another implementation the damping drive parameter brakes such a motion, particularly for individual components.

By determining the target velocity based on particularly fixed or variable, predetermined one-dimensional or multi-dimensional minimum velocities, in one embodiment advantageously a motion of the robot, particularly a motion commanded by a resilience control and/or manual guidance of the robot, is influenced below this minimum velocity maximally to a limited extent, particularly at least essentially not influenced by the damping drive parameter, particularly for individual components.

By determining such a target velocity based on a one-dimensional or multi-dimensional distance of the robot from a predetermined boundary, in one embodiment advantageously a motion of the robot, particularly a motion commanded by a resilience control and/or manual guidance of the robot, upon approaching the boundary and/or the proximity of the respective boundary or boundaries, is damped stronger by the damping drive parameter and/or at a greater distance from the respective boundary damped to a lesser extent by the damping drive parameter such that particularly in a permitted range defined by the boundary/boundaries advantageously a free(er) motion is possible, particularly for individual components.

A distance of the robot from a predetermined boundary can represent in one embodiment a distance of one and/or the robot-fixed reference, particularly the TCP of the robot from a boundary predetermined in the operating space of the robot. Similarly, a distance of the robot from a predetermined boundary can include in one embodiment a distance of a joint and/or drive position from a boundary predetermined in the joint and/or drive coordinate space of the robot, particularly represent it.

Generalizing, a one-dimensional or multi-dimensional upper limit is designated $q_{max}$, a one-dimensional or multi-dimensional lower limit is designated $q_{min}$, and a one-dimensional or multi-dimensional (actual) position and orientation of the robot in the operating or joint or drive coordinate space of the robot is designated $q_{ist}$. Then, in one embodiment the one-dimensional or multi-dimensional distance $dist_i$ of the robot from a predetermined boundary i, particularly for individual components and/or for the j component and/or coordinate, according to $$dist_i = (q_{max,i} - q_{ist}) bzw \cdot dist_{j,i} = (q_{j,max,i} - q_{j,ist}) \quad (1)$$

and/or $$dist_i = (q_{ist} - q_{min,i}) bzw \cdot dist_{j,i} = (q_{j,ist} - q_{j,min,i}) \quad (1')$$

can be defined and/or determined. It is discernible that in one embodiment generally the distance is subject to an algebraic sign, and particularly for individual components, is precisely positive when the robot is below a predetermined upper limit and/or above a predetermined lower limit and/or within a permissible range, and vice versa, particularly for individual components, is precisely negative if the robot is above a predetermined upper limit and/or below a predetermined lower limit and/or outside a permissible range.

Accordingly, in one embodiment the target velocity is determined in general, particularly for individual components such that when it shows the same distance value of the robot from the same predetermined boundary (absolutely and/or considering the algebraic sign) it is greater if the robot is at a permitted side of the boundary, and (absolutely and/or considering the algebraic sign) it is smaller if the robot is at an impermissible side of the boundary.

If in one embodiment n≥1 boundaries are predetermined, particularly one or more upper limits and lower limits for one or more components and/or coordinates of the position or orientation of the robot, particularly in the operating or joint or drive coordinate space, in one implementation the smallest distance (seen absolutely), particularly the smallest component (seen absolutely) of the multi-dimensional distance is determined as a (one-dimensional) distance dist of the robot from all of these predetermined boundaries, if applicable also the maximum negative distance with regards to value:

$$dist = \min_{\substack{i=1,\ldots,n \\ (j=1,\ldots,f)}} \{dist_{(j),i}\}, \quad (1'')$$

$$dist = [dist, dist, \ldots]^T$$

This way advantageously a perhaps maximally exceeded limit is considered. Similarly, the distance based on which the target velocity is determined can also be multi-dimensional in an appropriate fashion, particularly determined for various spatial directions of the operating space or various joints and/or drives of the robot and/or for individual components:

$$dist_j = \min_{i=1,\ldots,n} \{dist_{j,i}\}, \quad (1''')$$

$$dist = [dist_1, dist_2, \ldots, dist_f]^T$$

In one embodiment one and/or the above-mentioned resilience drive parameter is determined based on a resilience control, particularly an impedance or admittance control, and the drive arrangement is additionally controlled based on the resilience drive parameter, particularly based on a sum of the damping drive parameter and the resilience drive parameter.

An impedance or admittance control provides in one embodiment in a common fashion a spring characteristic, particularly a spring damper and/or a mass-spring characteristic, particularly a mass-spring damper characteristic of the robot so that it follows a virtual spring and/or spring-damper arrangement and/or (re)acts as a (mass) spring (damper) system showing a stiffness and/or damping that is predeterminable by control parameters. To this regard, reference is made additionally to US 2004/0128026 A1 mentioned at the outset, with its content here explicitly being included in the present disclosure. For a more compact illustration, in the present case generally a regulation is also considered a control in the sense of the present invention so that for example a control of the robot and/or a controlling of the drive arrangement in particular also includes a regulating of the robot and/or a regulating of the drive arrangement.

An advantageous behavior of the robot can be realized by a resilience control known per se, particularly a manual guidance and/or advantageous collision behavior. If in one embodiment the damping drive parameter is applied additionally, particularly additively, to the resilience drive parameter of the resilience control and/or the drive arrangement is controlled based on the sum of damping and/or resilience drive parameter, beneficially the damping of the resilience control can be adjusted for its stiffness, particularly in order to reduce and particularly prevent overshooting, and simultaneously by the damping drive parameter independent therefrom provide a limitation to a maximum velocity and/or a stronger damping in the proximity of predetermined boundaries.

Accordingly, in a further development a damping, particularly a damping parameter and/or damping coefficient of the resilience control, depends on a stiffness, particularly a stiffness parameter and/or stiffness coefficient of the resilience control, particularly in a linear fashion and/or based on a Lehr-damping.

In one embodiment the target velocity, which hereinafter is designated $\dot{q}_{soll}$ without limitation of the general scope, is provided with an upper limit particularly for individual components, in the amounts by the predetermined maximum velocity, which hereinafter is designated $\dot{q}_{max}$ without limitation of the general scope. Additionally or alternatively the target velocity $\dot{q}_{soll}$ is provided with a lower limit, particularly individual components thereof, in its amount by the predetermined minimum velocity, which hereinafter is designated $\dot{q}_{min}$ without limitation of its general scope.

$$|\dot{q}_{min}| \leq |\dot{q}_{soll}| \leq |\dot{q}_{max}| \quad (2)$$

Multi-dimensional velocities may be limited according to individual components:

$$|\dot{q}_{j,min}| \leq |\dot{q}_{j,soll}| \leq |\dot{q}_{j,max}| \quad (2)$$

In one embodiment the target velocity, particularly in its individual components, according to $$\dot{q}_{soll} = K_{Pq} \cdot dist \quad (3)$$

or $$\dot{q}_{soll} = K_{Pq} \cdot dist + |\dot{q}_{min}| \quad (3')$$

may be defined and/or determined with the predetermined one-dimensional or multi-dimensional positive constant $K_{Pq} = diag(K_{1,Pq}, K_{2,Pq}, \ldots)$ and the vector $|\dot{q}_{min}| = [|\dot{q}_{1,min}|, |\dot{q}_{2,min}|, \ldots]^T$, with the one-dimensional or multi-dimensional distance potentially being defined and/or determined particularly according to the equation (1)-(1''), particularly under the additional framework condition (2):

$$dist_{(j)} < 0 \overset{(3)}{\Rightarrow} \dot{q}_{j,soll} < 0 \overset{(2)}{\Rightarrow} \dot{q}_{j,soll} = \dot{q}_{j,min} \qquad (4)$$

and/or $$dist_{(j)} < 0 \overset{(3')}{\Rightarrow} \dot{q}_{j,soll} < |\dot{q}_{j,min}| \overset{(2)}{\Rightarrow} \dot{q}_{j,soll} = \dot{q}_{j,min} \qquad (4')$$

In other words, in one embodiment the predetermined minimum velocity is determined as the target velocity, particularly its individual components, when the robot is located in the impermissible range beyond the predetermined boundary/boundaries ($dist_{(j)} < 0$).

Additionally or alternatively, in one embodiment, particularly for individual components, the predetermined maximum velocity is determined under the additional framework condition (2) as the target velocity when the robot is located in the permissible range within the predetermined boundary/boundaries ($dist_{(j)} > 0$) and shows a predetermined distance therefrom:

$$K_{(j),Pq} \cdot dist_{(j)} > |\dot{q}_{j,max}| \overset{(3)}{\Rightarrow} \dot{q}_{j,soll} > |\dot{q}_{j,max}| \overset{(2)}{\Rightarrow} \dot{q}_{j,soll} = |\dot{q}_{j,max}| \qquad (5)$$

and/or $$K_{(j),Pq} \cdot dist_{(j)} + |\dot{q}_{j,min}| > |\dot{q}_{j,max}| \overset{(3')}{\Rightarrow} \dot{q}_{j,soll} > |\dot{q}_{j,max}| \overset{(2)}{\Rightarrow} \dot{q}_{j,soll} = |\dot{q}_{j,max}| \qquad (5')$$

Additionally or alternatively, in one embodiment the magnitude of the target velocity increases, particularly in its components, with the distance of the robot from a predetermined boundary, particularly linearly and/or according to the equation (3) and/or (3'), when the robot is located within the boundary, particularly up to the predetermined maximum velocity.

As explained above, this may apply particularly for individual components, thus for example for the j-component $\dot{q}_{j,soll}$ of the target velocity $\dot{q}_{soll}$:

$$\dot{q}_{j,soll} = K_{j,Pq} \cdot dist_{(j)} \qquad (3)$$

or $$\dot{q}_{j,soll} = K_{j,Pq} \cdot dist_{(j)} + |\dot{q}_{j,min}| \qquad (3')$$

with $dist_{(j)}$ potentially representing the one-dimensional distance and/or the respective j-component of the multi-dimensional distance according to the equation (1)-(1") and $\dot{q}_{j,min}$ the one-dimensional minimum velocity or the respective component of the multi-dimensional minimum velocity.

In one embodiment the damping drive parameter, which here is generally designated $\tau_d$, acts here particularly upon individual components opposite in reference to the actual velocity, which here is generally designated $\dot{q}_{ist}$ and/or seeks to reduce it. In consideration of the algebraic sign, in one embodiment it particularly applies $$\dot{q}_{ist} > 0 \Rightarrow \tau_d \leq 0;\ \dot{q}_{ist} < 0 \Rightarrow \tau_d \geq 0 \qquad (6)$$

and/or $$\dot{q}_{j,ist} > 0 \Rightarrow \tau_{j,d} \leq 0;\ \dot{q}_{j,ist} < 0 \Rightarrow \tau_{j,d} \geq 0 \qquad (6)$$

Additionally or alternatively in one embodiment the damping drive parameter $\tau_d$, particularly for individual components, is determined such that it abstains from exceeding a predetermined amount, particularly a positive minimum value $\tau_{d0}$, in particular is at least essentially equal to zero if the (components of the) target velocity exceeds in its magnitude the (components of the) actual velocity:

$$|\dot{q}_{soll}| > |\dot{q}_{ist}| \Rightarrow |\tau_d| < \tau_{d0} \qquad (7)$$

and/or $$|\dot{q}_{soll}| > |\dot{q}_{ist}| \Rightarrow \tau_d = 0 \qquad (7')$$

In other words, in one embodiment at least essentially no damping drive parameter and/or component is applied and/or commanded in the respective degree of freedom if the actual velocity is with its magnitude below the target velocity. As mentioned above, the equations (7), (7') may apply particularly for individual components:

$$|\dot{q}_{j,soll}| > |\dot{q}_{j,ist}| \Rightarrow |\tau_{j,d}| < \tau_{j,d0} \qquad (7)$$

and/or $$|\dot{q}_{j,soll}| > |\dot{q}_{j,ist}| \Rightarrow \tau_{j,d} = 0 \qquad (7')$$

Additionally or alternatively, in one embodiment the damping drive parameter $\tau_d$, is provided with an amount for its upper limit particularly for individual components by a predetermined maximum value, which hereinafter is designated $\tau_{max}$ without limitation thereto:

$$|\tau_d| \leq \tau_{max} \qquad (8)$$

and/or $$|\tau_{j,d}| \leq \tau_{j,max} \qquad (8)$$

Additionally or alternatively, in one embodiment the damping drive parameter, particularly for individual components, is determined such that its magnitude increases with the difference between the (respective component of the) target velocity and the (respective component of the) actual velocity, particularly the magnitude is proportional to the difference between the (respective component of the) target velocity and the (respective component of the) actual velocity, when the (respective component of the) actual velocity exceeds in its magnitude the (respective component of the) target velocity:

$$(|\dot{q}_{ist,2}| - |\dot{q}_{soll,2}|) > (|\dot{q}_{ist,1}| - |\dot{q}_{soll,1}|) > 0 \Rightarrow \tau_d(\dot{q}_{ist,2}, \dot{q}_{soll,2}) > \tau_d(\dot{q}_{ist,1}, \dot{q}_{soll,1}) \qquad (9)$$

and/or $$|\dot{q}_{ist}| - |\dot{q}_{soll}| > 0 \Rightarrow |\tau_d| = K_{Pv} \cdot (|\dot{q}_{soll}| - |\dot{q}_{ist}|) \qquad (9'),$$

with the predetermined one-dimensional or multi-dimensional constant $K_{Pv} = diag(K_{1,Pv}, K_{2,Pv}, \ldots)$, particularly under additional framework conditions (6), (7), and/or (7') and/or (8). The framework condition (6) can particularly according to $$|\dot{q}_{ist}| - |\dot{q}_{soll}| > 0 \Rightarrow \tau_d = sgn(\dot{q}_{ist}) \cdot K_{Pv} \cdot (|\dot{q}_{soll}| - |\dot{q}_{ist}|) \qquad (9'')$$

with the algebraic sign and/or signum function sgn be considered, with $\tau_d$ and $\dot{q}_{ist}$ being defined with identical algebraic signs, i.e. the damping drive parameter $\tau_d$ of the actual velocity $\dot{q}_{ist}$ each being and/or acting oppositely.

As already mentioned, the equations (9)-(9") can also be applicable, particularly for individual components:

$$(|\dot{q}_{j,ist,2}| - |\dot{q}_{j,soll,2}|) > (|\dot{q}_{j,ist,1}| - |\dot{q}_{j,soll,1}|) > 0 \Rightarrow \tau_{j,d}(\dot{q}_{ist,2}, \dot{q}_{soll,2}) > \tau_{j,d}(\dot{q}_{ist,1}, \dot{q}_{soll,1}) \qquad (9)$$

and/or $$|\dot{q}_{j,ist}| - |\dot{q}_{j,soll}| > 0 \Rightarrow |\tau_{j,d}| = K_{j,Pv} \cdot (|\dot{q}_{j,soll}| - |\dot{q}_{j,ist}|) \qquad (9'),$$

and/or $$|\dot{q}_{j,ist}| - |\dot{q}_{j,soll}| > 0 \Rightarrow \tau_{j,d} = sgn(\dot{q}_{j,ist}) \cdot K_{j,Pv} \cdot (\dot{q}_{j,soll}| - |\dot{q}_{j,ist}|) \qquad (9'')$$

According to one aspect of the present invention, a system for controlling a robot is implemented or embodied in particular by hardware and/or software and/or program technology to execute a method described here, comprising:
  means for determining the actual velocity of the robot;
  means for determining the target velocity based on the predetermined maximum velocity, the predetermined minimum velocity, and/or the distance of the robot from at least the predetermined boundary/boundaries;
  means for determining the damping drive parameter based on the difference between the target velocity and the actual velocity; and
  means for controlling the drive arrangement with at least one drive of the robot based on the damping drive parameter.

In one embodiment the system comprises means for determining the resilience drive parameter based on the resilience control, particularly an impedance or admittance control, with the means for controlling the drive arrangement being arranged such that the drive arrangement additionally is controlled based on the resilience drive parameter, particularly based on a sum of the damping drive parameter and the resilience drive parameter.

In one embodiment the system includes means for providing the value of an upper limit of the target velocity by the predetermined maximum velocity and/or a lower limit by the predetermined minimum velocity.

In one embodiment the system comprises means for determining the target velocity such that in its magnitude it is greater at the same distance of the robot from this predetermined boundary, if the robot is within the permitted boundaries, and smaller if the robot is beyond the permitted boundaries.

In one embodiment the system comprises means for determining the damping drive parameter such that it does not exceed a predetermined minimum value, particularly for individual components, in particular it is at least essentially equal to zero, if the target velocity exceeds the magnitude of the actual velocity.

In one embodiment the system comprises means to set, particularly for individual components, upper limits of the magnitude for the damping drive parameter by a predetermined maximum parameter.

In one embodiment the system comprises means for determining the damping drive parameter such that, particularly for individual components, it grows in its magnitude with the difference between the target velocity and the actual velocity, particularly in its magnitude proportional in reference to the difference between the target velocity and the actual velocity when the actual velocity exceeds in its magnitude the target velocity.

A means in the sense of the present invention may be embodied by way of technical hardware and/or software means, in particular a processing, in particular micro-processing unit (CPU), preferably connected via a storage and/or bus system transmitting data and/or signals, in particular digital ones, and/or show one or more programs or program modules. The CPU may be embodied such that commands are implemented to process a program saved in a storage system, record input signals from a data bus and/or issue output signals to a data bus. A storage system may comprise one or more, in particular different storage media, in particular optical, magnetic, solid matter, and/or other non-volatile media. The program may be embodied such that it represents and/or can implement the methods described here such that the CPU can execute the steps of such methods and thus can in particular control the robot.

BRIEF DESCRIPTION OF DRAWINGS

The above and other objects and advantages of the present invention shall be made apparent from the accompanying drawings and the description thereof.

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
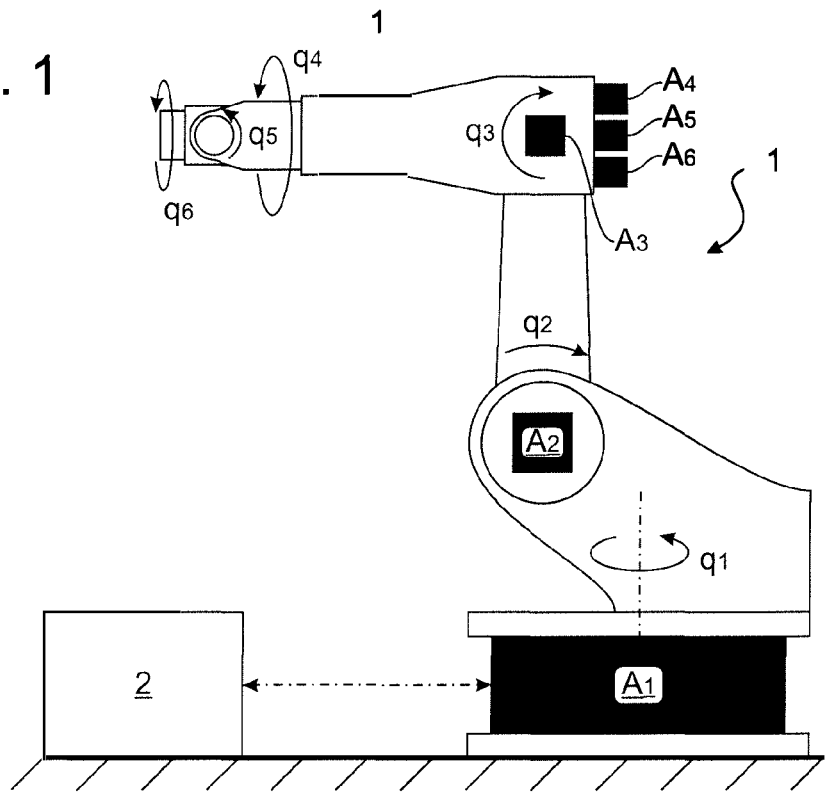
FIG. 1 shows a robot and a system for controlling the robot according to one embodiment of the present invention.
Figure 5:
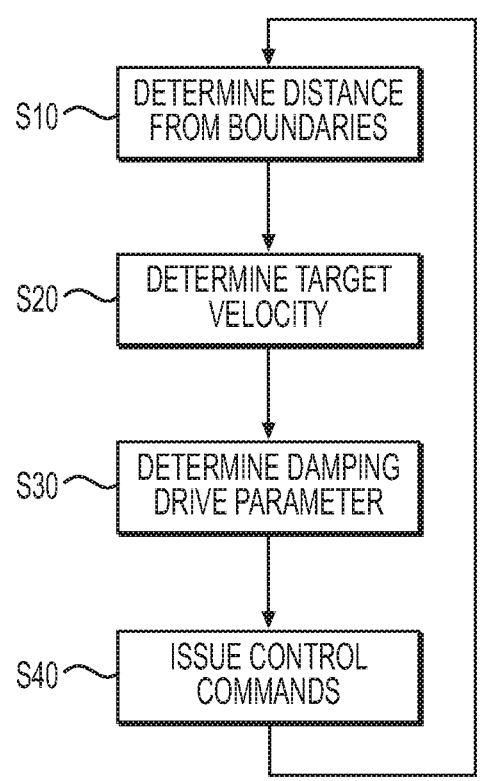
FIG. 5 shows a method for controlling the robot according to one embodiment of the present invention.

FIGS. 1, 5 show a robot 1 with drives $A_1, \ldots, A_6$ and a system with the control 2 for controlling the robot 1 and/or a method implemented by the control 2 for controlling the robot 1 according to one embodiment of the present invention.

Figure 2:
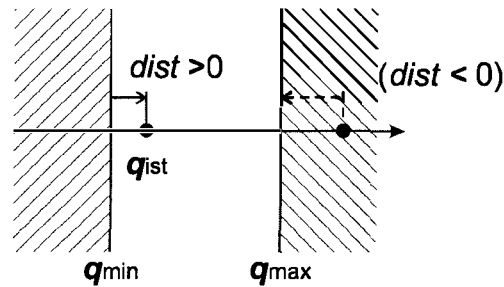
FIG. 2 shows a distance of the robot from the predetermined boundaries.

In a first step S10 the control 2 determines the distance dist of the robot 1 from predetermined boundaries $q_{max}$, $q_{min}$ according to the above-stated equations (1) to (1"). This is illustrated in FIG. 2. Here, $q_{ist}$ marks a detected actual position of the robot 1, for example one or more of its joint angles $q_1, \ldots, q_6$ indicated in FIG. 1 or one or more components of a position and/or orientation of its TCP in the respective work space. Accordingly, $q_{max}$, $q_{min}$ may also be predetermined, particularly with regards to joint angles or the operating space.

In the position and orientation of the robot 1 shown, as an example the positive distance from the lower limit $q_{min}$ according to the equations (1') is smaller than the also positive distance from the upper limit $q_{max}$ according to the equations (1), and thus according to equations (1") it is determined as the distance dist of the robot 1 from the predetermined boundaries $q_{max}$, $q_{min}$. For illustration purposes, dot-dash lines also show another actual position of the robot in the impermissible (hatched in FIG. 1) area above the predetermined upper limit $q_{max}$, which would be equivalent to a negative distance<0.

If here boundaries are predetermined in several spatial directions and/or joints, in particular the (seen absolutely and/or subject to an algebraic sign) smallest distance is determined as the distance dist, as illustrated in FIG. 2.

The determination of the distance can also occur as described in the following step in one embodiment in individual components such that $q_{min}$, $q_{max}$, and $q_{ist}$ each can illustrate one component of the position along the coordinate axis indicated in FIG. 2.

Figure 3:
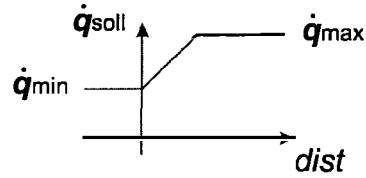
FIG. 3 shows a target velocity in reference from the distance.

Then the control 2 determines a target velocity a $\dot{q}_{soll}$ in a step S20 according to the equation (3') under the additional framework conditions according to the equation (2). This is illustrated in FIG. 3. This represents here on the one side the linear function of the target velocity a $\dot{q}_{soll}$ from the (actual position-depending) distance of the robot 1 to the predetermined boundaries (cf. equation (3')) and on the other side the limitation of the magnitude of the target velocity by a predetermined maximum velocity $\dot{q}_{max}$ towards the top and by a predetermined minimum velocity $\dot{q}_{min}$ towards the bottom (cf. equation (2)). As already mentioned, this can occur particularly for individual components such that $\dot{q}_{soll}$, $\dot{q}_{max}$, and $\dot{q}_{min}$ each may represent a component of the velocity.

Figure 4:
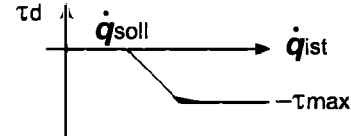
FIG. 4 shows a damping drive parameter in reference to the target and an actual velocity.

Then the control 2 determines in a step S30 according to the equation (9") under the additional framework conditions (7') and (8) a damping drive parameter $\tau_d$. This is illustrated in FIG. 4. This represents on the one hand a limitation of the magnitude of the damping drive parameter $\tau_d$ by the predetermined maximum parameter $\tau_{max}$ according to the equation (8). On the other hand it is clear that the damping drive parameter $\tau_d$ is determined such that it is equal to zero if the target velocity $\dot{q}_{soll}$ exceeds with its magnitude the actual velocity $\dot{q}_{ist}$ (cf. equation (7')). If inversely the actual velocity $\dot{q}_{ist}$ exceeds in its magnitude the target velocity $\dot{q}_{soll}$, the damping drive parameter $\tau_d$ according to the equation (9") is determined such that it increases in its magnitude proportional to the difference between the target velocity $\dot{q}_{soll}$ and the actual velocity $\dot{q}_{ist}$ until it is limited by the maximum defined $\tau_{max}$. Here the damping drive parameter $\tau_d$ according to the equation (6) is opposite in reference to the actual velocity $\dot{q}_{ist}$. As mentioned, this can occur in turn particularly for individual components such that $\dot{q}_{soll}$, $\dot{q}_{ist}$, and $\tau_d$ and/or $\tau_{max}$ may represent one component each of the velocity and/or a drive force or a drive torque/moment of a drive $A_1, \ldots A_6$.

This damping drive parameter $\tau_d$ commands the control 2 commands in a step S40 additively to the resilience drive parameter based on a resilience control, particularly an impedance or admittance control in a manner known per se and thus it is not shown in greater detail, to the drives $A_1, \ldots, A_6$ of the robot 1.

Although exemplary embodiments have been explained in the above description, it is hereby noted that a number of modifications are possible.

As repeatedly mentioned the steps can be performed particularly for one or more components of positions, velocity, and drive parameters and/or degrees of freedom of the robot 1, which may be as above-stated vector-defined parameters also in a scalar fashion and mark a position, velocity and/or drive parameter in a spatial direction or a degree of freedom in a drive or joint coordinate system.

The individual calculations and/or equations can particularly be respectively implemented in the drive and/or joint coordinate system or in the operating space of the robot, with the parameters if applicable being transferred between these rooms by forward and backward transformation. For example, boundaries predetermined in the operating space are transformed into the drive and/or joint coordinate space and then the drive forces and/or torque/moments are determined here directly. Similarly, drive parameters determined in the operating space can also be transformed into the drive and/or joint coordinate space.

In addition, it is hereby noted that the exemplary embodiments are merely examples which are not intended to in any way restrict the scope of protection, the uses, and the construction. Rather, the preceding description gives a person skilled in the art a guideline for the implementation of at least one exemplary implementation, wherein various modifications, in particular with respect to the function and arrangement of the components described, can be undertaken without departing from the scope of protection as indicated by the claims and the equivalent combinations of features.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE NUMBERS a. robot
b. control
$A_1, \ldots, A_6$ drive
$q_1, \ldots, q_6$ joint angle
$q_{ist}$ actual position
$q_{max}, q_{min}$ upper/lower limit
$\dot{q}_{soll}$ target velocity
$\dot{q}_{ist}$ actual velocity
$\dot{q}_{max}, \dot{q}_{min}$ maximum/minimum velocity
dist distance
$\tau_d$ damping drive parameter
$\tau_{max}$ maximum value

What is claimed is:

1. A method for controlling a robot having a controller and a drive arrangement with at least one drive, the method comprising:
   determining an actual velocity of the robot;
   determining a target velocity for the robot;
   determining a damping drive parameter based on a difference between the target velocity and the actual velocity; and
   controlling the drive arrangement with the controller based on the damping drive parameter;
   wherein the target velocity is determined based on at least one of a predetermined maximum velocity, a predetermined minimum velocity, or a distance of the robot from at least one predetermined boundary;
   wherein the damping drive parameter is determined to be zero when the magnitude of the target velocity exceeds the magnitude of the actual velocity.

2. The method of claim 1, further comprising:
   determining a compliance drive parameter based on a compliance control; and
   controlling the drive arrangement based additionally on the compliance drive parameter.

3. The method of claim 2, wherein the compliance control is an impedance control or admittance control.

4. The method of claim 2, wherein controlling the drive arrangement based additionally on the compliance drive parameter comprises controlling the drive arrangement based on a sum of the damping drive parameter and the compliance drive parameter.

5. The method of claim 2, wherein a damping in the compliance control is based on a stiffness.

6. The method of claim 1, wherein the magnitude of the target velocity is at least one of:
   limited at its upper end by the predetermined maximum velocity; or
   limited at its lower end by the predetermined minimum velocity.

7. The method of claim 1, wherein the target velocity is determined such that, for a given distance of the robot from the predetermined boundary, the target velocity is greater when the robot is located on a permissible side of the predetermined boundary, and the target velocity is smaller when the robot is located on an impermissible side of the predetermined boundary.

8. The method of claim 1, wherein the magnitude of the target velocity increases with the distance of the robot from the predetermined boundary when the robot is on a permissible side of the predetermined boundary.

9. The method of claim 1, wherein the damping drive parameter is in a direction opposite to the actual velocity.

10. The method of claim 1, wherein magnitude of the damping drive parameter is limited on the upper end by a predetermined maximum value.

11. The method of claim 1, wherein the damping drive parameter is determined such that its magnitude increases with the difference between the target velocity and the actual velocity, when the magnitude of the actual velocity exceeds the magnitude of the target velocity.

12. The method of claim 11, wherein the damping drive parameter is proportional to the difference between the target velocity and the actual velocity, when the magnitude of the actual velocity exceeds the magnitude of the target velocity.

13. A system for controlling a robot having a drive arrangement with at least one drive, the system comprising:
means for determining an actual velocity of the robot;
means for determining a target velocity for the robot based on at least one of a predetermined maximum velocity, a predetermined minimum velocity, or a distance of the robot from at least one predetermined boundary;
means for determining a damping drive parameter based on a difference between the target velocity and the actual velocity; and
means for controlling the drive arrangement based on the damping drive parameter;
wherein the damping drive parameter is determined to be zero when the magnitude of the target velocity exceeds the magnitude of the actual velocity.

14. A computer programming product for controlling a robot having a controller and a drive arrangement with at least one drive, the computer programming product including a program code stored on a non-transitory, computer-readable medium that, when executed by the controller, causes the controller to:
determine an actual velocity of the robot;
determine a target velocity for the robot;
determine a damping drive parameter based on a difference between the target velocity and the actual velocity; and
control the drive arrangement based on the damping drive parameter;
wherein the target velocity is determined based on at least one of a predetermined maximum velocity, a predetermined minimum velocity, or a first distance of the robot from at least one predetermined boundary;
wherein the damping drive parameter is determined to be zero when the magnitude of the target velocity exceeds the magnitude of the actual velocity.

* * * * *